(12) United States Patent
Fink et al.

(10) Patent No.: US 9,248,708 B2
(45) Date of Patent: Feb. 2, 2016

(54) LOCALIZATION WITH SYNCHRONIZED EMISSIONS FOR COUPLED WHEELS

(71) Applicant: Continental Automotive Systems, Inc., Auburn Hills, MI (US)

(72) Inventors: Alexander Fink, Oakland Township, MI (US); Jean-Christophe Deniau, Fenton, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 13/764,387

(22) Filed: Feb. 11, 2013

(65) Prior Publication Data

US 2014/0148990 A1   May 29, 2014

Related U.S. Application Data

(60) Provisional application No. 61/731,306, filed on Nov. 29, 2012.

(51) Int. Cl.
*B60C 23/00* (2006.01)
*B60C 23/04* (2006.01)

(52) U.S. Cl.
CPC ........... *B60C 23/007* (2013.01); *B60C 23/0416* (2013.01); *B60C 23/0489* (2013.01)

(58) Field of Classification Search
CPC .............. B60C 23/007; B60C 23/0416; B60C 23/0489
USPC ....................................... 701/29.4
See application file for complete search history.

(56) References Cited

U.S. PATENT DOCUMENTS

| | | | |
|---|---|---|---|
| 7,768,383 B2 | 8/2010 | Fink et al. | |
| 8,204,645 B2 * | 6/2012 | Weston | 701/33.9 |
| 8,258,931 B2 * | 9/2012 | Lefaure | 340/425.5 |
| 8,498,759 B1 * | 7/2013 | Juzswik | 701/10 |
| 2010/0231403 A1 * | 9/2010 | Bortolin | 340/686.1 |
| 2011/0169627 A1 | 7/2011 | Fink | |
| 2011/0313623 A1 * | 12/2011 | Greer et al. | 701/49 |
| 2012/0022801 A1 * | 1/2012 | Miller et al. | 702/42 |
| 2012/0112899 A1 * | 5/2012 | Hannon | 340/445 |
| 2012/0242502 A1 * | 9/2012 | Steiner et al. | 340/870.07 |
| 2013/0076104 A1 * | 3/2013 | Hannah et al. | 301/35.51 |

FOREIGN PATENT DOCUMENTS

| | | |
|---|---|---|
| EP | 2450202 A1 | 5/2012 |
| FR | 2914472 A1 | 10/2008 |
| WO | 2011/085877 A1 | 7/2011 |

OTHER PUBLICATIONS

International Search Report and Written Opinion dated Feb. 21, 2014, from corresponding International Patent Application No. PCT/US2013/072262.

* cited by examiner

*Primary Examiner* — John R Olszewski
*Assistant Examiner* — Todd Melton

(57) ABSTRACT

A disclosed system for monitoring and locating a position of a tire pressure monitoring device within a tire includes a controller configured to detect a first transmission from a first sensor installed within a first wheel and a second transmission from a second sensor installed within a second wheel coupled to the first wheel. The controller and system utilizes a relative angular position corresponding to receipt of the transmissions to identify a lead and trailing tire pressure monitoring device. The controller is then enabled to correlate the signals with a known sequence of sensors to determine within which of the coupled tire assembly includes which tire pressure monitoring device.

20 Claims, 4 Drawing Sheets

LOCALIZATION WITH SYNCHRONIZED EMISSIONS FOR COUPLED WHEELS

CROSS REFERENCE TO RELATED APPLICATION

This application claims priority to U.S. Provisional Application No. 61/731,306 which was filed on Nov. 29, 2012.

BACKGROUND

This disclosure generally relates to a system and method of determining a location of a tire pressure monitoring sensor. More particularly, this disclosure relates to a system and method for determining a location of a tire pressure monitoring sensor within a coupled wheel configuration.

Tire pressure monitoring devices are mounted within vehicle wheels to sense and communicate information indicative of tire conditions to a controller such that a driver may be alerted when conditions deviate from desired conditions. Current systems associate an identification code of the sensor with a specific tire location. This association of each sensor with a tire location can be accomplished automatically using known unique rotation patterns and paths for each individual tire and correlating those unique patterns with incoming signals. Such location techniques rely on different wheel rotations for each of the wheels. However, such techniques cannot differentiate between sensors mounted within coupled wheels that rotate at common speeds.

SUMMARY

An example disclosed system and method provides for the localization of tire pressure monitoring devices within coupled wheel assemblies.

The system includes a controller configured to detect a first transmission from a first sensor installed within a first wheel and a second transmission from a second sensor installed within a second wheel coupled to the first wheel. The controller is further configured and programmed to correlate a first angular position with one of the first and second transmissions and a second angular position with the other of the first and second transmissions. The relative angular positions between the tire pressure monitoring sensors is known and enable the controller to determine the location of each of the first and second sensors based on a comparison between the angular positions of the transmissions.

Although the different examples have specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
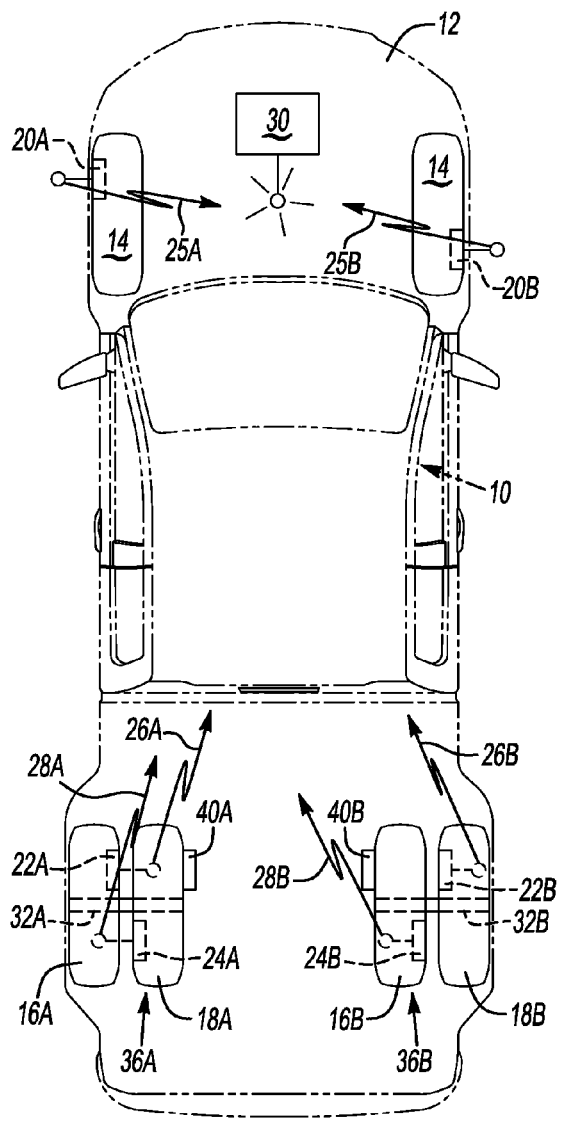
FIG. 1 is a schematic view of a vehicle including an example tire pressure monitoring system.

Referring to FIG. 1, a disclosed tire pressure monitoring system 10 is schematically illustrated and mounted within a vehicle 12. The vehicle 12 includes front tires 14 and rear coupled wheel assemblies 36a, 36b. The coupled wheel assemblies 36a, 36b include a first wheel 16a-b and a second wheel 18a-b. The corresponding first and second wheels 16a-b, 18a-b are coupled by a physical link 32a-b. Each of the wheel assemblies 36a, 36b includes a first tire pressure monitoring device 22a-b and a second tire pressure monitoring device 24a-b mounted in corresponding first and second wheels 16a-b, 18a-b. Each of the front wheels 14 includes a tire pressure monitoring device 20a-b that sends a signal indicative of conditions within the tire. A controller 30 receives transmissions from the front tire pressure monitoring devices 20a-b and the first and second tire pressure monitoring devices 22a-b, 24a-b mounted within the rear coupled wheel assemblies 36a, 36b. The system 10 further receives information from a wheel speed sensor 40a-b disposed at each of the coupled wheel assemblies 36a, 36b.

Figure 2:
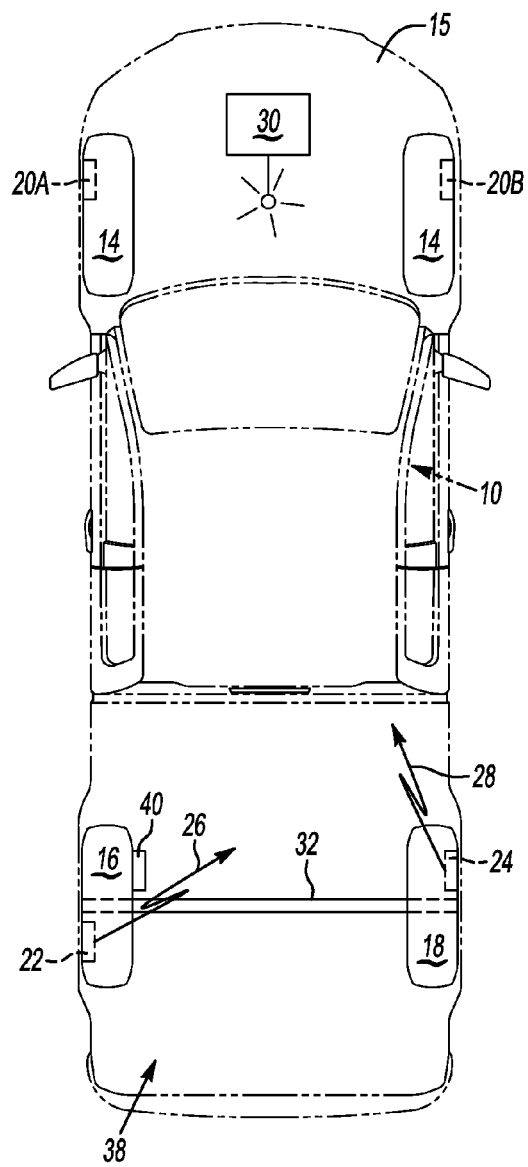
FIG. 2 is a schematic view of another vehicle including the example tire pressure monitoring system.

Referring to FIG. 2, another example vehicle 15 includes a coupled wheel assembly 38 that includes first and second wheels 16, 18 attached through a single rigid connection 32. The rigid connection 32 extends across the vehicle 15. The first wheel 16 includes the first tire pressure monitoring device 22 and the second wheel 18 includes the second tire pressure monitoring device 24. The disclosed system 10 and method will be described with regard to the example shown in FIG. 1, but is also applicable to the example illustrated in FIG. 2.

Referring to FIG. 1, the transmissions 25a-b, 26a-b, 28a-b are radio frequency transmissions in a frequency modulated format known as FSK or an amplitude modulated format known as a ASK. As appreciated, other communication and signal formats are within the contemplation and scope of this disclosure. Transmissions 25a-b are from the front tire pressure monitoring devices 20a-b, and the transmissions 26a-b, 28a-b are from corresponding first and second tire pressure monitoring devices from the rear wheel assemblies 36a, 36b.

The controller 30 is configured to determine and associate each signal received with a specific one of the tire pressure monitoring devices 20a-b, 22a-b, and 24a-b. Each of the tire pressure monitoring devices 20a-b, 22a-b and 24a-b includes a unique identification code that is transmitted with each signal. A transmission can therefore be easily associated with a specific one of the tire pressure monitoring devices 20a-b, 22a-b and 24a-b. However, the location of the tire pressure monitoring device and specifically the vehicle wheel associated with a particular one of the tire pressure monitoring devices 20a, 22a-b and 24a-b requires additional information.

Conventional location methods utilize different wheel speeds as communicated by wheel speed sensors 40a-b for each of the wheels to determine the location of the corresponding tire pressure monitoring sensor. Each individual tire pressure monitoring sensor rotates with one of the wheels and therefore each signal will correspond with a wheel position and speed unique to one of the wheels. Only one of the signals from the tire pressure monitoring device will correspond with an angular position and speed of one of the wheels as provided by the wheel speed sensor. However, in this example the rear wheel assemblies 36a-b are coupled and thereby the corresponding first and second wheels 16a-b, 18a-b rotate at a common speed and therefore the first and second transmissions 26a-b,28a-b cannot be readily identified as they will not have unique combinations based on different wheel speeds.

Because the wheels 16a and 18a are coupled by a rigid mechanical link 32a-b, the wheels 16a and 18a will rotate identically and thereby not be distinguishable based on wheel speed. The wheel sensors 40a-b will detect a common rotation between the first tire 16a-b and the second tire 18a-b and thereby a common rotation of the tire pressure monitoring sensors 22a-b and 24a-b.

The example controller 30 is configured to recognize that the first transmission 26a and the second transmission 28a originate from the set of coupled wheels 36a that rotate at a common speed. The controller 30 is further configured to utilize a known relative mounting position between the tire pressure monitoring sensors 22a and 24a to determine which of the first and second wheels 16a, 18a corresponds with which of the first and second tire pressure monitoring sensors 22a and 24a.

In the example illustrated in FIG. 1, the controller 30 will process transmissions from the first and second tires 16, 18 of each of the coupled wheel assemblies 36a, 36b separately. Each of the wheel assemblies 36a, 36b will rotate at different speeds and therefore the controller 30 is configured to recognize and associate the wheel sensors 22a-b, 24a-b that are associated with each of the wheel assemblies 36a, 36b. The example method is described below with regard to a single one of the first and second coupled wheel assemblies 36a, 36b and is repeated for each coupled wheel assembly 36a, 36b.

Figure 3:
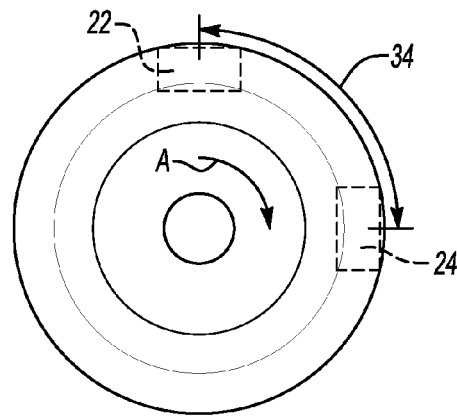
FIG. 3 is a schematic illustration of the relative position between first and second tire pressure monitoring devices disposed on separate wheels of a coupled wheel.
Figure 4A:
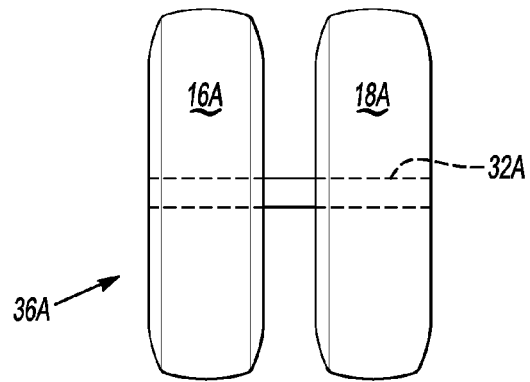
FIG. 4a is a schematic view of a coupled wheel assembly.
Figure 4B:
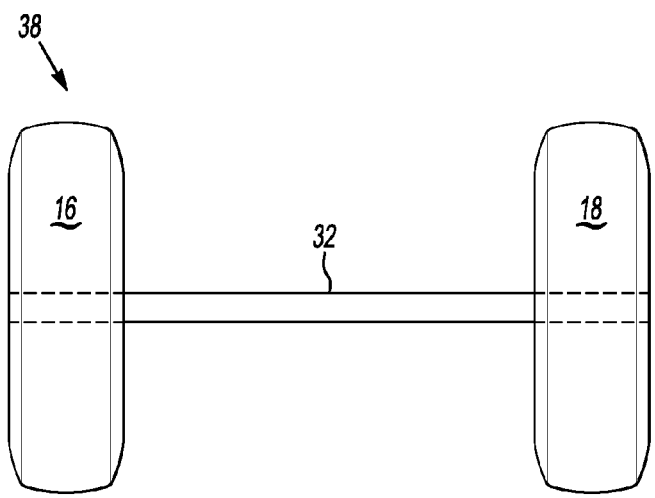
FIG. 4b is another example of a coupled wheel assembly.
Figure 5:
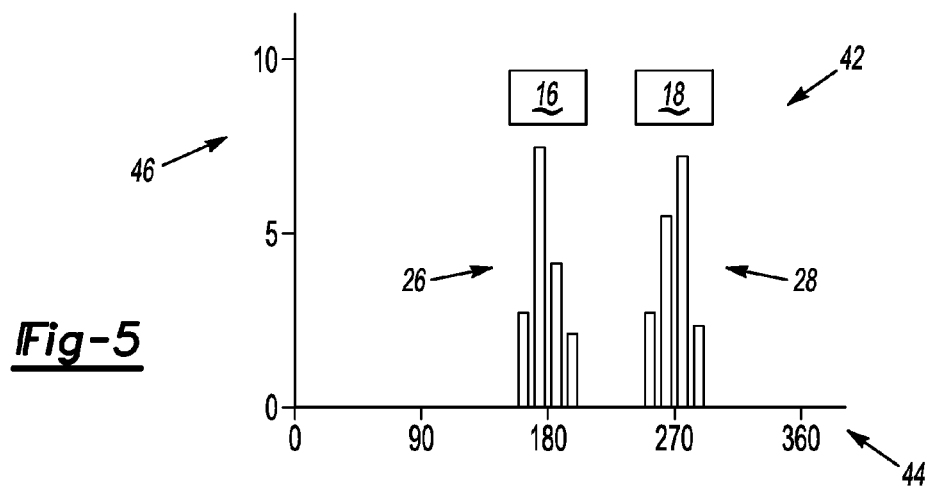
FIG. 5 is a graph illustrating a number of received signals relative to an angular position.

Referring to FIGS. 3, 4 and 5 with continuing reference to FIGS. 1 and 2, the example method and system 10 utilizes a relative angular position between the tire pressure monitoring sensors 22, 24 to determine and assign a location within each of the first and second tires 16, 18. The determined location refers to the first and second tires 16, 18 of a coupled wheel assembly 36a in which the corresponding first and second tire pressure monitoring sensors 22a, 24b are mounted.

In this example, the first tire pressure monitoring sensor 22 within the first wheel 16 is mounted approximately 90° relative to the second tire pressure monitoring device 22 mounted in the second wheel 18. The angular difference between the first tire pressure monitoring sensor 22 and the second tire pressure monitoring sensor 24 is indicated at 34 and is less than 180° to provide a clear difference between the first and second tire pressure monitoring sensors 22, 24. In this example the angle 34 is approximately 90° although any angle that is less than 180° could be utilized. As appreciated, if the sensors 22, 24 were mounted 180° from each other there would be no determining which was leading or trailing.

Because both the sensors 22, 24 converge on the same coupled wheel assembly 36a they can no longer be clearly distinguished by looking only at the speed of the wheels. The angular orientation, indicated in FIG. 3 of the first sensor 22 is utilized to determine a lead sensor and a trailing sensor. The lead sensor is that sensor from which a signal is first received for wheel rotating in the direction indicated by the arrow A.

FIG. 5 illustrates transmissions 26 and 28 and how they are received in relation to an angular position provided by the wheel sensor 40. In this example, receipt of an identification tags and signals for sensors corresponding to the wheel sensor 40 is indicated by the graph 42. Graph 42 illustrates the first transmission 26 and the second transmission 28 in relation to the angular position 44 of the coupled wheel assembly 36a at the time the signal is received. Signals from each of the sensors 22, 24 are indicated as hits corresponding with the angular orientation 44.

In this example, the angular orientation includes hits originating from a tire pressure monitoring device 22 within the first wheel 16 at 180°. A second group of transmissions 28 are gathered around a 270° angle and correspond with the second wheel 18. The controller 30 is preprogrammed to recognize that a lead sensor when the wheel is rotating in the direction A is mounted within the first wheel 16 and the trailing sensor is mounted within the second wheel 18.

Accordingly, it can be determined that the transmissions 26 from the lead sensor 22 are from the first tire pressure monitoring sensor 22a in the first wheel 16 and transmissions 28 from the second sensor 24 are in the second wheel 18.

The localization task is therefore split into two steps. First the controller 30 recognizes that more than one signal is received at a time corresponding with one wheel speed sensor 40. The controller 30 then determines which of the transmissions 26, 28 are from a lead sensor and which is from a trailing sensor for rotation of the wheels in the forward direction indicated by arrow A. As appreciated, a vehicle traveling in reverse will have different lead and trailing sensor signals. In this example, the wheel direction is in the forward direction, however, the same method and techniques could be utilized with the vehicle traveling in reverse.

The controller 30 is then configured to proceed to a second step and correlate the receipt of the transmissions 26, 28 relative to an angular position provided by the wheel speed sensor 40. The controller 30 utilizes the known relative angular relationship between the tire pressure monitoring sensors 22a and 24a to determine which of the first and second tires corresponds with the first and second tire pressure monitoring sensors 22a, 24a. The identification made by the controller 30 relies on the known angular orientation between the first and second tire pressure monitoring devices 22, 24. Because the controller 30 recognizes that the tire pressure monitoring sensors are orientated apart by the angle 34 it is possible to determine and associate within which tire a sensor transmitting a signal is mounted.

Figure 6:
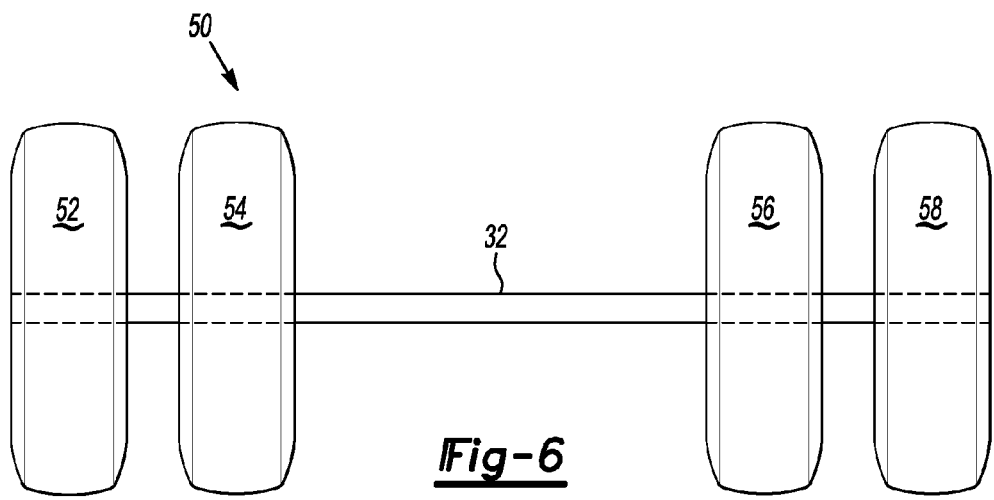
FIG. 6 is a schematic view of another coupled wheel assembly.
Figure 7:
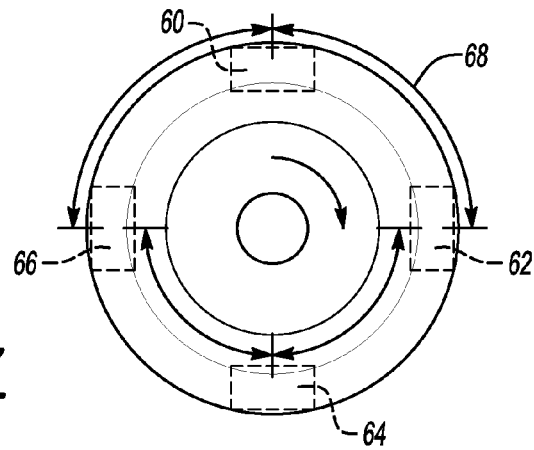
FIG. 7 is a schematic view illustrating relative position between tire pressure monitoring sensors for the example couple wheel assembly.
Figure 8:
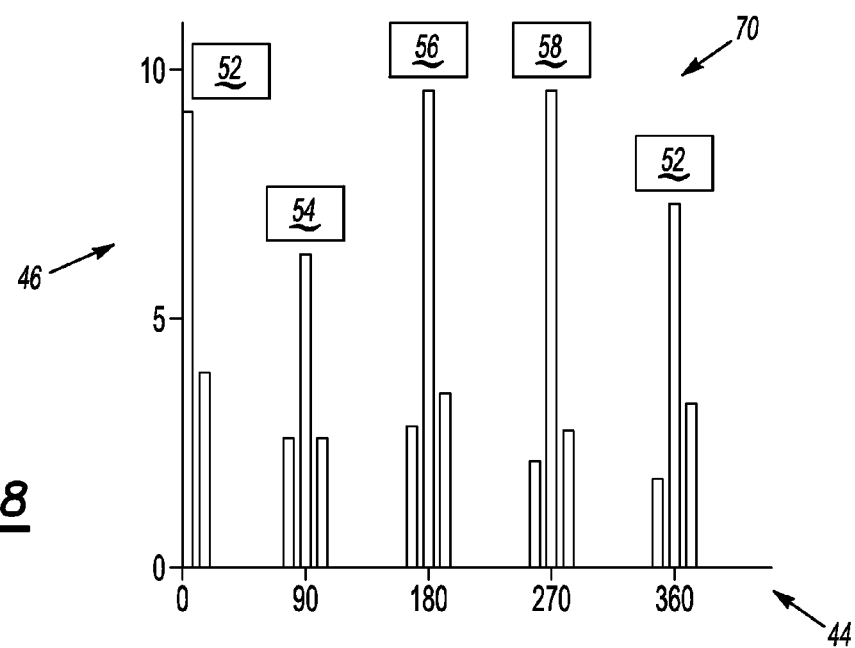
FIG. 8 is a graph illustrating received transmissions relative to an angular position.

Referring to FIGS. 6, 7, and 8 the example method can be utilized for the dual rigid axle combination including coupled wheels on both ends of a fixed axle indicated at 50. The example dual fixed axle assembly 50 includes first, second, third and fourth wheels 52, 54, 56 and 58 all coupled to the fixed shaft 32 and therefore all rotate at a common wheel speed. In this example embodiment, each of the sensors mounted in the separate wheels at different spaced apart angularly by an angle 68. In this example the angle 68 is approximately 90°. The controller 30 will first determine that each of a first, second, third and fourth tire pressure monitoring sensors 60, 62, 64, and 66 are rotating at a common speed utilizing a wheel speed sensor disposed on the axle 32.

Once the controller 30 has identified the tire pressure monitoring devices 60, 62, 64 and 66 that are rotating at a common speed, the controller 30 utilizes the known relative angular orientation between the devices 60,62,64 and 66 to determine within which tire the devices are located. In this example, each of the sensors 60, 62, 64 and 66 are all spaced apart by an angle 68 that is about 90°. The controller 30 is programmed to determine a lead sensor and then the sequence of devices that follow the lead sensor to determine and locate within which of the wheels 52, 54, 56 and 58 a sensor is mounted.

Figure 9:
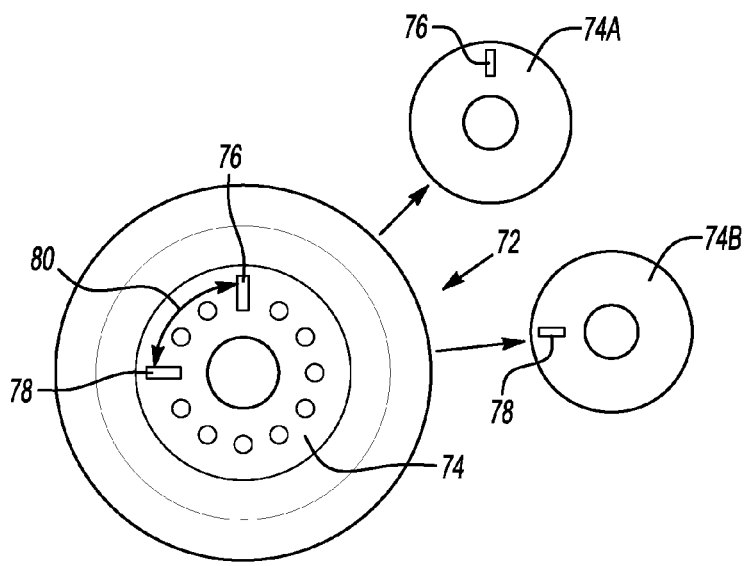
FIG. 9 is a schematic illustration showing alignment features.

Referring to FIG. 9, the example system and method relies on a known orientation of the tire pressure monitoring devices in a coupled wheel combination. Therefore the wheel rim can include features for setting a desired relative orientation of tire pressure monitoring sensors. In this example, a wheel rim 74 includes a first alignment feature 76 and a second alignment feature 78 that are spaced apart angularly at an angle 80. In this example, the alignment feature 76, 78 are slots into which a key portion of the tire pressure monitoring sensor is received to set the desired relative position. The alignment features 76, 78 also aid in orienting the wheel rims 74 relative to each other such that upon assembly to the vehicle the coupled wheel combination positions the corresponding tire pressure monitoring sensors at the desired relative angular orientations.

Figure 10:
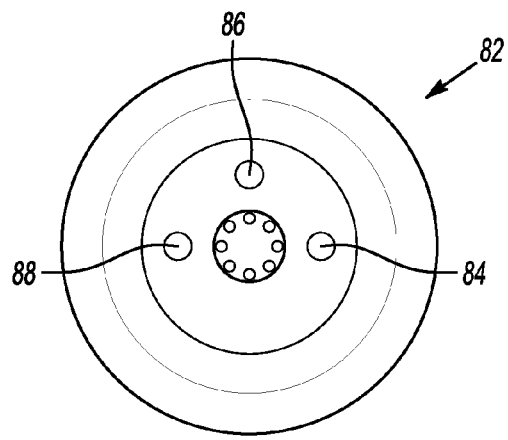
FIG. 10 is a schematic illustration showing yet another embodiment of alignment features.
Figure 11:
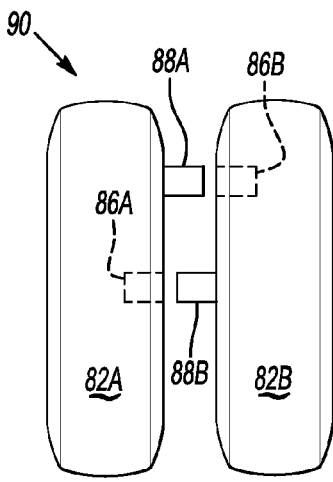
FIG. 11 is a schematic illustration illustrating the alignment features for the dual wheel assembly.
Figure 11:
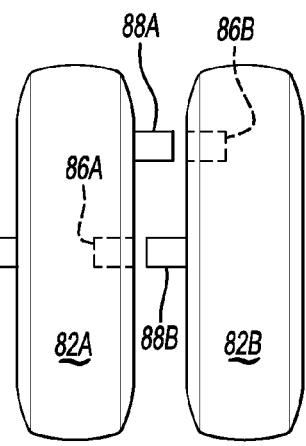

Referring to FIGS. 10 and 11, another example alignment feature is disclosed and includes a valve stem 84 that provides the position where the tire pressure monitoring device will be assembled. Each of the wheel rims 82 includes alignment features. In this example the alignment features include an opening 86 that receives a nipple 88. Each of the wheels 82 includes both opening 86 and the nipple 88. The orientation of the opening 86 and nipple 88 define and set the desired relative angular orientation between the coupled wheels, and thereby the relative position of the tire pressure monitoring devices.

Accordingly, assembling of the coupled wheel assemblies 90 provides that the nipple 88b is received within opening 86a and the nipple 88a on a first tire 82a is received within an opening 86b on a second tire 82b. The relative orientation between the tire pressure monitoring systems for each coupled wheel is therefore maintained and provided at the desired angular position. Although example alignment features are disclosed, other alignment configuration may be utilized to define and set a relative orientation between tire pressure monitoring sensors assembled within a coupled wheel assembly.

Accordingly, the disclosed method and system provides a significantly simple, cheaper and more reliable method and means for determining an origin of a signal generated by a tire pressure monitoring system within a coupled wheel assembly.

Although an example embodiment has been disclosed, a worker of ordinary skill in this art would recognize that certain modifications would come within the scope of this disclosure. For that reason, the following claims should be studied to determine the scope and content of this invention.

What is claimed is:

1. A method of configuring a controller to detect a location of a tire pressure monitoring sensor comprising:
configuring a controller to detect a first transmission from a first sensor installed within a first wheel;
configuring the controller to detect a second transmission from a second sensor installed within a second wheel coupled to the first wheel;
configuring the controller to recognize that the first wheel and the second wheel are comprised in a wheel assembly, the recognizing comprising detecting that the first wheel and the second wheel rotate at a common speed;
configuring the controller to correlate a first angular wheel assembly position with one of the first and second transmissions and a second angular wheel assembly position with the other of the first and second transmissions, wherein the correlating comprises correlating a tire pressure monitoring sensor identification tag with a respective one of first and second angular wheel positions at a time of receipt of a respective one of the first and second transmissions; and
configuring the controller to determine the location of each of the first and second sensors relative to the wheel assembly based on a comparison between the first angular wheel assembly position, the second angular wheel assembly position, and a predetermined relative angular relationship between the first sensor and the second sensor, wherein the determining of the location of each of the first and second sensors relative to the wheel assembly comprises determining which of the first and second sensors is a lead sensor and upon determining the lead sensor determining the location of at least one sensor other than the lead sensor relative to a vehicle and the wheel assembly based at least in part on the sequence of receipt of a transmission from at least one sensor other than the lead sensor with respect to receipt of a transmissions from the lead sensor, a relative angular position of the at least one sensor other than the lead sensor with respect to the lead sensor, and direction of rotation of the wheel assembly.

2. The method as recited in claim 1, wherein the first angular wheel assembly position is separated from the second angular wheel assembly position by less than 180 degrees.

3. The method as recited in claim 1, wherein the first angular wheel assembly position is separated from the second angular wheel assembly position by about 90 degrees.

4. The method as recited in claim 1, including the step of configuring the controller to determine which of the first transmission and the second transmission correspond with a lead one of the first and second sensors and which of the first and second transmissions corresponds with a following one of the first and second sensors.

5. The method as recited in claim 4, including the step of configuring the controller to recognize that the lead one of the first and second sensors corresponds with a predetermined one of the first and second wheels and that the following one of the first and second sensors corresponds with the other of the first and second wheels.

6. The method as recited in claim 1, including the step of configuring the controller to recognize that the first transmission and the second transmission originate from first and second wheels rotating at a common speed.

7. The method as recited in claim 1, wherein the predetermined relative angular relationship between the first sensor and the second sensor is set by assembling the wheel assembly.

8. A system for monitoring conditions within a tire comprising:
a controller configured to detect a first transmission from a first sensor installed within a first wheel, a second transmission from a second sensor installed within a second wheel coupled to the first wheel, the controller further configured to recognize that the first wheel and the second wheel are comprised in a wheel assembly, the recognizing comprising detecting that the first wheel and the second wheel rotate at a common speed, and to correlate a first angular wheel assembly position with one of the first and second transmissions and a second angular wheel assembly position with the other of the first and second transmissions, wherein the correlating comprises correlating a tire pressure monitoring sensor identification tag with a respective one of first and second angular wheel positions at a time of receipt of a respective one of the first and second transmissions, wherein the controller is configured to determine the location of each of the first and second sensors relative to the wheel assembly based on a comparison between the first angular wheel assembly position, the second angular wheel assembly position, and a predetermined relative angular relationship between the first sensor and the second sensor, wherein the determining of the location of each of the first and second sensors relative to the wheel assembly comprises determining which of the first and second sensors is a lead sensor and upon determining the lead sensor determining the location of at least one sensor other than the lead sensor relative to a vehicle and the wheel assembly based at least in part on the sequence of receipt of a transmission from at least one sensor other than the lead sensor with respect to receipt of a transmissions from the lead sensor, a relative angular position of the at least one sensor other than the lead sensor with respect to the lead sensor, and direction of rotation of the wheel assembly.

9. The system as recited in claim 8, including first tire pressure monitoring device mounted within the first wheel and a second tire pressure monitoring device mounted within the second wheel.

10. The system as recited in claim 9, wherein the first wheel and the second wheel include an alignment feature for orientating the first tire pressure monitoring device relative to the second tire pressure monitoring device.

11. The system as recited in claim 9, wherein the first angular wheel assembly position is separated from the second angular wheel assembly position by less than 180 degrees.

12. The system as recited in claim 9, wherein the controller is configured to determine which of the first transmission and the second transmission correspond with a lead one of the first and second sensors and which of the first and second transmissions corresponds with a following one of the first and second sensors.

13. The system as recited in claim 12, wherein the controller is configured to recognize that the lead one of the first and second sensors corresponds with a predetermined one of the first and second wheels and that the following one of the first and second sensors corresponds with the other of the first and second wheels.

14. The system as recited in claim 9, wherein the controller is configured to recognize that the first transmission and the second transmission originate from first and second wheels rotating at a common speed.

15. The system as recited in claim 8, wherein the predetermined relative angular relationship between the first sensor and the second sensor is set by assembling the wheel assembly.

16. A system for monitoring conditions within a tire comprising:
a first tire pressure monitoring device mounted within a first wheel, wherein the first tire pressure monitoring device generates a first transmission indicative of conditions within the first wheel;
a second tire pressure monitoring device mounted within a second wheel coupled to the first wheel, wherein the second tire pressure monitoring device generates a second transmission indicative of conditions within the second wheel; and
a controller configured to detect a first transmission from a first sensor installed within a first wheel, a second transmission from a second sensor installed within a second wheel coupled to the first wheel, the controller further configured to recognize that the first wheel and the second wheel are comprised in a wheel assembly, the recognizing comprising detecting that the first wheel and the second wheel rotate at a common speed, and to correlate a first angular wheel assembly position with one of the first and second transmissions and a second angular wheel assembly position with the other of the first and second transmissions, wherein the correlating comprises correlating a tire pressure monitoring sensor identification tag with a respective one of first and second angular wheel positions at a time of receipt of a respective one of the first and second transmissions, wherein the controller is configured to determine the location of each of the first and second sensors relative to the wheel assembly based on a comparison between the first angular wheel assembly position, the second angular wheel assembly position, and a predetermined relative angular relationship between the first sensor and the second sensor, wherein the determining of the location of each of the first and second sensors relative to the wheel assembly comprises determining which of the first and second sensors is a lead sensor and upon determining the lead sensor determining the location of at least one sensor other than the lead sensor relative to a vehicle and the wheel assembly based at least in part on the sequence of receipt of a transmission from at least one sensor other than the lead sensor with respect to receipt of a transmissions from the lead sensor, a relative angular position of the at least one sensor other than the lead sensor with respect to the lead sensor, and direction of rotation of the wheel assembly.

17. The system as recited in claim 16, wherein the first wheel and the second wheel each include alignment features for orientating the first tire pressure monitoring device in a different angular orientation relative to the second tire pressure monitoring device.

18. The system as recited in claim 17, wherein the alignment features orientate the first tire pressure monitoring device at an angular orientation of less than 180 degrees from the second tire pressure monitoring device.

19. The system as recited in claim 16, wherein the controller is configured to determine which of the first transmission and the second transmission correspond with a lead one of the first and second sensors and which of the first and second transmissions corresponds with a following one of the first and second sensors, wherein the controller is further configured to recognize that the lead one of the first and second sensors corresponds with a predetermined one of the first and second wheels and that the following one of the first and second sensors corresponds with the other of the first and second wheels.

20. The system as recited in claim 16, wherein the predetermined relative angular relationship between the first sensor and the second sensor is set by assembling the wheel assembly.

* * * * *